US012569402B2

(12) United States Patent
Gong et al.

(10) Patent No.: US 12,569,402 B2
(45) Date of Patent: Mar. 10, 2026

(54) CAP ASSEMBLY FOR REUSABLE MEDICINE CONTAINER, AND USES THEREOF

(71) Applicant: Cabinet Health P.B.C., Brooklyn, NY (US)

(72) Inventors: Russell Eliot Gong, Weston, CT (US); Achal Apurva Patel, Brooklyn, NY (US)

(73) Assignee: Cabinet Health P.B.C., Brooklyn, NY (US)

( * ) Notice: Subject to any disclaimer, the term of this patent is extended or adjusted under 35 U.S.C. 154(b) by 68 days.

(21) Appl. No.: 18/559,852

(22) PCT Filed: May 9, 2022

(86) PCT No.: PCT/US2022/072216
§ 371 (c)(1),
(2) Date: Nov. 9, 2023

(87) PCT Pub. No.: WO2022/241407
PCT Pub. Date: Nov. 17, 2022

(65) Prior Publication Data

US 2024/0252397 A1 Aug. 1, 2024

Related U.S. Application Data

(60) Provisional application No. 63/187,826, filed on May 12, 2021.

(51) Int. Cl.
*A61J 1/14* (2023.01)
*B65D 41/16* (2006.01)

(52) U.S. Cl.
CPC ............ *A61J 1/1425* (2015.05); *B65D 41/16* (2013.01); *B65D 2313/04* (2013.01)

(58) Field of Classification Search
CPC .... A61J 1/1425; A61J 2205/10; A61J 1/1418; B65D 41/16; B65D 2313/04;
(Continued)

(56) References Cited

U.S. PATENT DOCUMENTS 2,672,257 A 3/1954 Simmonds
3,307,739 A 3/1967 Cloyd et al.
(Continued)

FOREIGN PATENT DOCUMENTS

CN 2233376 Y 8/1996
CN 2365148 Y 2/2000
(Continued)

OTHER PUBLICATIONS

Amazon.ca, Site visited Mar. 16, 2023, "Odistar Desktop Vacuum Cleaner," First available Nov. 19, 2019, available online at <https://www.amazon.ca/dp/B07Y349YLD>, 6 pages.
(Continued)

*Primary Examiner* — Shawn M Braden
(74) *Attorney, Agent, or Firm* — Morrison & Foerster LLP

(57) ABSTRACT

Provided herein are container systems for the storage of refillable pharmaceutical products. The container systems include a cap assembly configured to hold a magnetic token in place on the exterior surface. The cap assembly and container systems include design features for child resistance, ease of storage, and ease of refilling or dispensing contents in the systems. Also provided are refillable pharmaceutical products storage kits that include the container system and a refill pouch.

14 Claims, 5 Drawing Sheets

(58) Field of Classification Search
CPC .... B65D 51/245; B65D 23/14; B65D 51/248; B65D 2203/12; B65D 41/0442; B65D 41/06; Y02W 30/80
See application file for complete search history.

(56) References Cited

U.S. PATENT DOCUMENTS

| | | | | |
|---|---|---|---|---|
| 3,402,842 | A * | 9/1968 | Millian | B65D 50/061 215/217 |
| D306,973 | S | 4/1990 | Kaplan | |
| D316,036 | S | 4/1991 | Kaplan | |
| D366,989 | S | 2/1996 | Zimmerman | |
| D399,392 | S | 10/1998 | Husted | |
| D430,777 | S | 9/2000 | Husted | |
| D441,615 | S | 5/2001 | Dretzka | |
| D475,239 | S | 6/2003 | Claypool | |
| D484,797 | S | 1/2004 | Kipper man et al. | |
| D490,278 | S | 5/2004 | Welsh | |
| D562,545 | S | 2/2008 | Dawson | |
| D620,368 | S | 7/2010 | Pedersen | |
| D668,143 | S | 10/2012 | Akana et al. | |
| D669,305 | S | 10/2012 | Smyers | |
| D684,824 | S | 6/2013 | Sweet et al. | |
| D691,037 | S | 10/2013 | Chen | |
| 8,915,371 | B2 | 12/2014 | Giocastro | |
| D730,112 | S | 5/2015 | Yessin et al. | |
| D732,686 | S | 6/2015 | Lui | |
| D764,799 | S | 8/2016 | Ball et al. | |
| D770,847 | S | 11/2016 | Stamper et al. | |
| D787,895 | S | 5/2017 | Kilduff et al. | |
| D790,335 | S | 6/2017 | Honings et al. | |
| D799,328 | S | 10/2017 | Puigbo | |
| D821,087 | S | 6/2018 | Lihotzky et al. | |
| D829,554 | S | 10/2018 | Liston | |
| D830,791 | S | 10/2018 | Lee | |
| D848,783 | S | 5/2019 | Zhong | |
| D864,568 | S | 10/2019 | Roberts | |
| D878,913 | S | 3/2020 | Castellanos et al. | |
| D911,098 | S | 2/2021 | Thurin et al. | |
| D930,186 | S | 9/2021 | Kim | |
| D994,317 | S | 8/2023 | Gong et al. | |
| D1,007,840 | S | 12/2023 | Gong et al. | |
| 2006/0213862 | A1 | 9/2006 | Smith | |
| 2011/0278195 | A1 | 11/2011 | Giocastro | |
| 2014/0061199 | A1 * | 3/2014 | Dalbec | B65D 51/24 53/471 |
| 2014/0125466 | A1 | 5/2014 | Pentz | |
| 2015/0366755 | A1 | 12/2015 | Milante | |
| 2016/0030285 | A1 * | 2/2016 | Miceli | B65D 50/068 215/207 |
| 2017/0265625 | A1 * | 9/2017 | Thorpe | A45D 33/006 |
| 2018/0290794 | A1 * | 10/2018 | Duquet | B65D 45/02 |
| 2020/0361672 | A1 | 11/2020 | Jinkins et al. | |
| 2022/0135296 | A1 * | 5/2022 | Wendelken | B65D 51/245 220/230 |
| 2022/0267062 | A1 * | 8/2022 | Huang | B65D 51/242 |

FOREIGN PATENT DOCUMENTS

| | | | | |
|---|---|---|---|---|
| CN | 210192251 | U | 3/2020 | |
| CN | 211434153 | U | 9/2020 | |
| CN | 306138308 | | 10/2020 | |
| CN | 112386480 | A | 2/2021 | |
| GB | 984927 | A | 3/1965 | |
| GB | 6074223 | | 10/2019 | |
| WO | WO-1988000167 | A1 | 1/1988 | |
| WO | WO-2002007133 | A1 | 1/2002 | |
| WO | WO-2005013247 | A1 | 2/2005 | |
| WO | WO-2017160633 | A2 * | 9/2017 | A45D 33/006 |
| WO | WO-2018144919 | A1 | 8/2018 | |

OTHER PUBLICATIONS

Amazon.com, Site visited Mar. 21, 2023, "CannaAroma Cube Jar," First available Aug. 6, 2020, available online at <https://www.amazon.com/Child-Proof-Cube-Glass-Containers/dp/B08QVHGY82?th=1>, 3 pages.
Amazon.com, Site visited Mar. 21, 2023, "Vini Pill Box," First available Nov. 24, 2020, available online at <https://www.amazon.com/Organizer-Compartment-Containers-Vitamin-Medicine/dp/B08P3KLPP5>, 4 pages.
ApriaDirect.com, Site visited Mar. 21, 2023, "Livility Paptizer UV Sanitizer," Oldest review dated Oct. 27, 2020, available online at <https://www.apriadirect.com/paptizeruvcledsmartsanitizerbyliviliti?gclid=EAlalQobChM11 rW6rL3g_QIVbCqzAB1WWQRQEAQYASABEgJpPD_BwE>, 6 pages.
Ikea.com, Site visited Mar. 21, 2023, "Square food container with lid," Oldest review dated Apr. 17, 2018, available online at <https://www.ikea.com/US/en/p/ikea-365-food-container-with-lid-square-glass-bamboo-s29269111/>, 6 pages.
International Search Report and Written Opinion received for International Patent Application No. PCT/US2022/072216 mailed on Jul. 18, 2022, 11 pages.
Notice of Allowance received for U.S. Appl. No. 29/783,354 mailed on Mar. 29, 2023, 7 pages.
Office Action received for India Patent Application No. 352920-001 mailed on Dec. 16, 2021, 2 pages.
Office Action received for India Patent Application No. 352921-001 mailed on Dec. 22, 2021, 2 pages.
Office Action received for International Registration No. DM/219257 mailed on Aug. 1, 2022, 15 pages.
Office Action received for U.S. Appl. No. 29/783,356 mailed on Mar. 31, 2023, 7 pages.
thegadgetflow.com, site visited Mar. 20, 2023, "This smart IoT pillbox is the smart medicine reminder you want," published by Lauren Wadowsky on Oct. 2, 2020 features the DEFI Smart IoT Pillbox, available online at <https://thegadgetflow.com/blog/smart-iot-pillbox/>, 6 pages.
Vimeo.com, Site visited Mar. 20, 2023, "Red Dot Award: Design Concept—Medicube," uploaded on Sep. 23, 2020 features the Medicube, available online at <https://vimeo.com/461238251>, 5 pages.
Gong et al., Design U.S. Appl. No. 29/783,356, filed May 12, 2021 for "Medicine Container."
Gong et al., Design U.S. Appl. No. 29/909,370, filed Aug. 4, 2023 for "Medicine Container."
Extended European Search Report and Written Opinion received for European Patent Application No. 22808511.4 mailed on Apr. 15, 2025, 8 pages.
Design U.S. Appl. No. 29/894,770, filed Jun. 15, 2023 for "Medicine Container."
Design U.S. Appl. No. 29/894,771, filed Jun. 14, 2023 for "Medicine Container."

* cited by examiner

CAP ASSEMBLY FOR REUSABLE MEDICINE CONTAINER, AND USES THEREOF

CROSS-REFERENCE TO RELATED APPLICATIONS

This application is a U.S. national stage application under 35 U.S.C. § 371 of International Application No. PCT/US2022/072216, filed May 9, 2022, which claims priority to U.S. Provisional Patent Application No. 63/187,826, filed May 12, 2021, each of which is incorporated herein by reference in its entirety.

FIELD

The present disclosure relates generally to packaging materials, and more specifically to a cap assembly for a container for storing refillable pharmaceutical products (e.g., medicine pills, tablets, etc.).

BACKGROUND

Currently, distribution of over-the-counter medicines typically generates large amounts of waste due to the high incidence of single use and short-term usage packaging materials. For example, packaging materials for medicine containers and pill packs are typically made from plastics, cardboards and foils, which are generally discarded once their contents have been consumed. Therefore, short-term usage products in pharmaceutical packaging presents large-scale waste management considerations. Container systems that typically house over-the-counter medicines can also vary widely in physical dimensions, such as size and shape. Such variability means that traditional pharmaceutical packaging systems may also present a challenge in the organization and storage of household pharmaceutical supplies.

What is therefore desirable in this art is to provide reusable medicine packaging with specific design features that facilitate organization and storage of pharmaceutical products, as well as tracking of information relating to the refillable pharmaceutical products contained in reusable containers.

BRIEF SUMMARY

In some aspects, provided is a cap assembly, comprising: a top, wherein the top has an exterior surface and an interior surface, wherein the exterior surface of the top is configured to receive a magnetic token; a side connected to and extending from the top; a gasket connected to the interior surface of the top; and a magnet positioned between the gasket and interior surface of the top, wherein the magnet is configured to hold the magnetic token in place on the exterior surface of the top.

In other aspects, provided is a container system, comprising: a container; and any of the cap assemblies described herein. In some embodiments, the container comprises: a body; and a neck extending from the body of the container and forming the mouth of the container, wherein the neck has an exterior surface and an interior surface. In some embodiments, the cap assembly comprises: a top, wherein the top has an exterior surface and an interior surface; a side connected to and extending from the top, wherein the side comprises an inner wall and an outer wall, wherein the inner wall is cylindrical and configured to engage with the neck of the container; a gasket connected to the interior surface of the top; and a magnet positioned between the gasket and interior surface of the top.

In yet other aspects, provided is refillable pharmaceutical products storage kit, comprising: any of the container systems described herein, and a refill pouch. In some embodiments, the refill pouch comprises: a first compartment configured to hold pharmaceutical products; and a second compartment configured to hold the magnetic token, wherein the magnetic token in the second compartment does not come into contact with the pharmaceutical products in the first compartment.

DESCRIPTION OF THE FIGURES

The present application can be understood by reference to the following description taken in conjunction with the accompanying figures.

DETAILED DESCRIPTION

Figure 1:
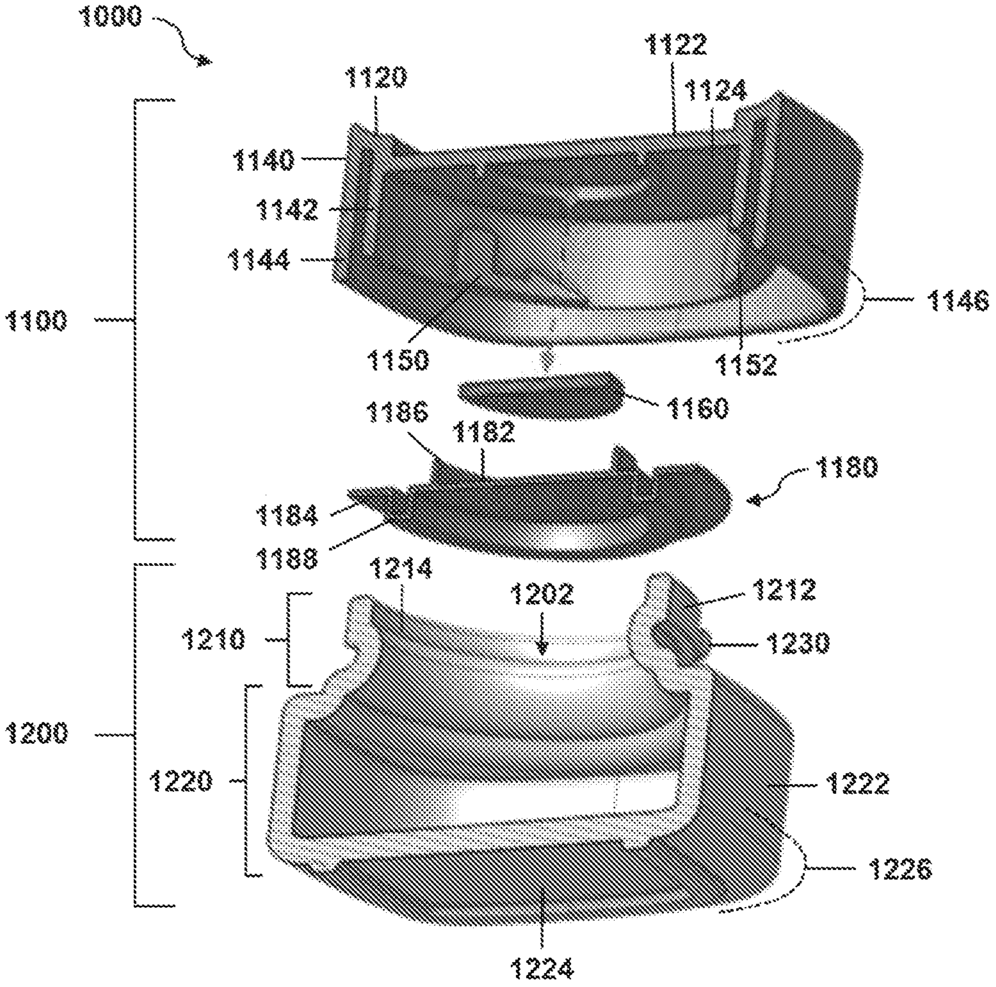
FIG. 1 depicts an exploded cross-sectional view of an exemplary container system, which includes a cap assembly and a container.

The following description sets forth exemplary systems, methods, parameters and the like. It should be recognized, however, that such description is not intended as a limitation on the scope of the present disclosure but is instead provided as a description of exemplary embodiments.

In some aspects, provided herein are container systems suitable for storing pharmaceutical products, including over-the-counter medicines. The container systems are sustainably designed, and can replace wasteful, plastic pill containers with reusable containers. The reusable containers can be used to store pharmaceutical products obtained from refill pouches. Thus, in certain aspects, provided herein are also refillable pharmaceutical products storage kits that include the container system, and refill pouches. In some embodiments, the refill pouches are compostable, and also contain information about the pharmaceutical product therein that can be easily transferred to the container system, which helps to replace the traditional drug fact label on most products.

The container systems provided herein include a cap assembly that is designed for use with a container, such as a glass bottle or jar, configured to hold pharmaceutical products. In some embodiments, the cap assembly is designed to receive a magnetic token that is provided with the refill pouches, in order to transfer drug product information to the reusable container.

The cap assembly, the container systems, and the refillable pharmaceutical products storage kits, and methods of using the foregoing, are described in further detail below.

Container System

In some aspects, provided is a container system that includes a cap assembly and a container. When the cap assembly is secured onto the container, the container system is in a closed position. The container is configured to hold any suitable products, such as pharmaceutical products. The container is designed to be reusable. For example, the user may refill the container with additional products, such as pharmaceutical products, that may be obtained from refill pouches. The cap assembly is configured to create a sealed container in the closed position, and may include additional features, such as a child resistant lock.

In some embodiments, the cap assembly includes a top that has an exterior surface and an interior surface. The exterior surface of the top is configured to receive a magnetic token. For example, in some embodiments, the exterior surface of the top has a recess on which to mount the magnetic token.

The cap assembly also includes a gasket connected to the interior surface of the top, and a magnet positioned between the gasket and interior surface of the top. The magnet is configured to hold the magnetic token in place on the exterior surface of the top. The gasket helps to provide an upward force on the cap assembly when secured onto the container and the container system is in a closed position. When the container system is in such closed position, the gasket also serves to provide a seal around the mouth of the container to prevent contents from entering/exiting the container. Finally, the gasket also helps to keep the magnet secured in the cap assembly by providing an upward force on the magnet.

The cap assembly also has a side connected to and extending from the top. The side has an exterior surface and an interior surface. In some embodiments, when the cap assembly is secured onto the container and the container system is in a closed position, the side is configured to surround the neck of the container, and the outer surface of the side aligns with the sides of the container to form a flat and continuous surface.

In some embodiments, the side of the cap assembly further includes at least one bayonet configured to hold the gasket in place. In some variations, the cap assembly includes one, two, three or four bayonets configured to hold the gasket in place. In some embodiments the cap assembly includes four bayonets spaced evenly around the cap assembly, configured to hold the gasket in place. The gasket is held in place by the upward pressure exerted by the top of the bayonet, and the downward pressure from the magnet.

In other embodiments, the side of the cap assembly further includes at least one bayonet that can lock into a receiving bayonet element positioned on the neck of the container. For example, the cap assembly is configured such that the user has to turn the cap assembly relative to the container in order to lock the bayonet into the receiving bayonet element. The gasket is configured to provide a counterforce for locking the cap assembly into the receiving bayonet element. In some embodiments, locking the bayonet into the receiving element engages a child resistant mechanism. In some embodiments, when the container system is in a closed position, at least two motions are required to disengage the child resistant mechanism and to open the container. When the container system is in a closed position, the user has to first push down on the cap assembly and then turn in order to clear the bayonet, to open the container system. In some embodiments, the gasket provides a counterforce to clear the bayonet, to open the container system.

With reference to FIG. 1, exemplary container system 1000 is depicted. Container system 1000 includes cap assembly 1100 and container 1200. Cap assembly 1100 includes top 1120, side 1140, magnet 1160, and gasket 1180. Top 1120 has exterior surface 1122 and interior surface 1124. Top 1120 is configured to receive a magnetic token (not depicted in the figure) on exterior surface 1122. The magnetic token positioned on exterior surface 1122 of top 1120 is held in place by magnet 1160, positioned on interior surface 1124 of top 1120. Magnet 1160 is held in place by gasket 1180.

Container 1200 includes neck 1210 and body 1220. Neck 1210 forms mouth 1202 of container 1200. Neck 1210 has exterior surface 1212 and interior surface 1214. Body 1220 is configured to hold products, such as pharmaceutical products. Body 1220 has side 1222 and bottom 1224. Body 1220 has outer perimeter 1226.

Figure 2A:
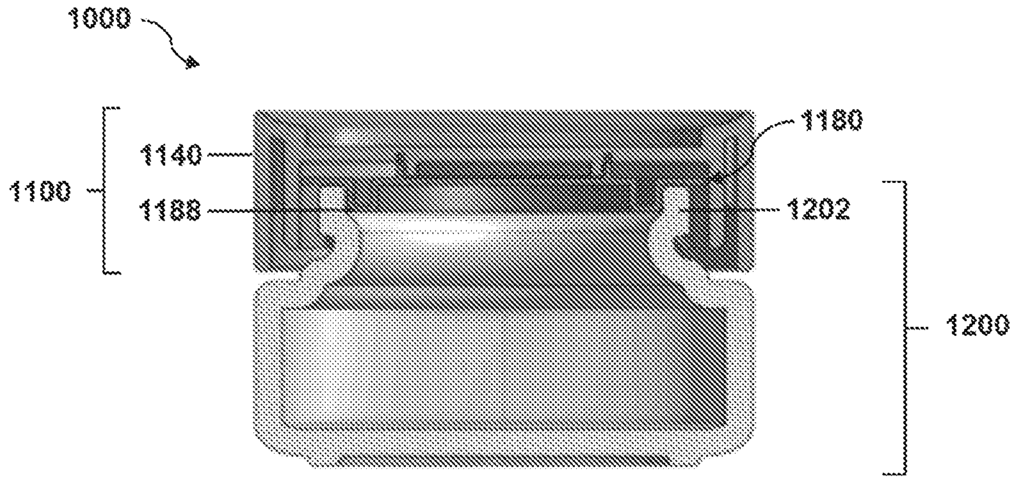
FIG. 2A depicts a side cross-sectional view of an exemplary container system, in which the cap assembly is secured onto the container.

When cap assembly 1100 is secured onto container 1200, container system 1000 is in a closed position, as depicted in FIG. 2A.

The parts of the cap assembly can be described in further detail with reference again to FIG. 1. Gasket 1180 has upper surface 1182 and lower surface 1184. Gasket 1180 includes upper rim 1186 extending from upper surface 1182 that is configured to hold magnet 1160 in place. Gasket 1180 further includes lower rim 1188 extending from lower surface 1184. As shown in FIG. 2A, side 1140 and lower rim 1188 of gasket 1180 are configured to engage with neck 1202 of container 1200 when cap assembly 1100 is secured onto container 1200.

With reference again to FIG. 1, side 1140 of cap assembly 1100 has inner wall 1142 and outer wall 1144. Inner wall 1142 is cylindrical and positioned to engage with neck 1210 of container 1200. Outer wall 1144 has outer perimeter 1146 that aligns with outer perimeter 1226 of body 1220 of container 1200.

Figure 2B:
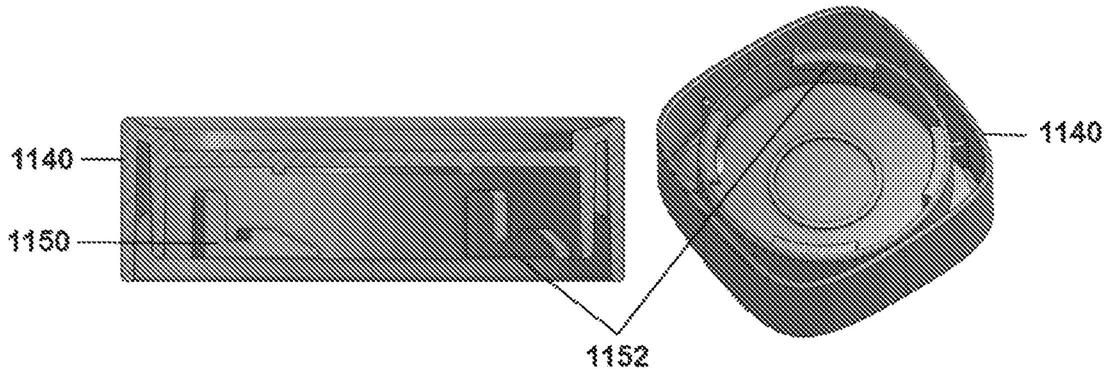
FIG. 2B depicts a cross-sectional view of an exemplary cap assembly (left) and a view of the underside of the corresponding cap assembly (right).
Figure 2C:
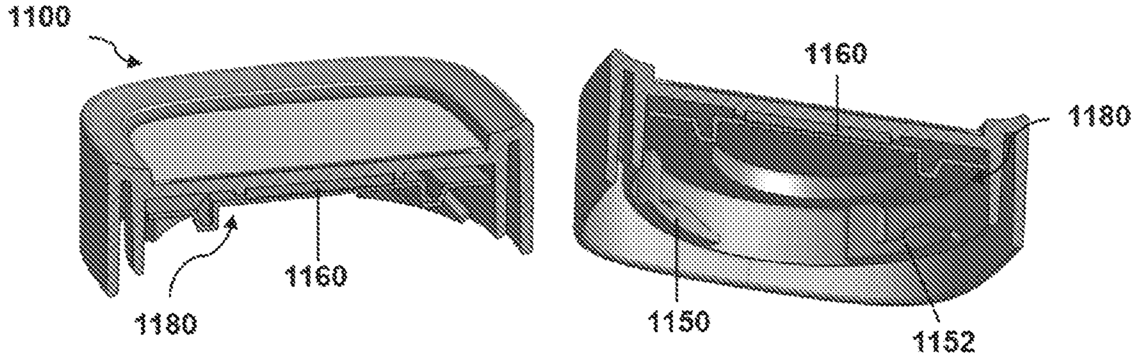
FIG. 2C depicts another cross-sectional view of the exemplary cap assembly from the top side with a magnetic token in place (left) and underside (right).

Side 1140 may further include one or more bayonets positioned on inner wall 1142. For example, with reference to FIGS. 1, 2B and 2C, cap assembly 1100 at least bayonets 1150 and 1152. Bayonets 1150 and 1152 provide a resting surface for gasket 1180, and are positioned to hold gasket 1180 in place. As discussed above, gasket 1180 is held in place by the upward pressure exerted by the top of =bayonets 1150 and 1152, and the downward pressure from magnet 1160. Bayonets 1150 and 1152 have corresponding receiving bayonet elements positioned on exterior surface 1212 of neck 1210. A part of a receiving bayonet element can be seen in element 1230 in FIG. 1. When cap assembly 1100 is secured onto container 1200, bayonet 1152 on cap assembly 1100 locks into its corresponding receiving bayonet element 1230 on container 1200, thereby locking container system 1000 closed. When container system 1000 is closed, the user has to first push down on cap assembly 1100 and then turn in order to clear the bayonet, to open container system 1000.

It should be understood while an exemplary embodiment of the container system is depicted in the aforementioned figures, other embodiments of the container system are envisioned. In some variations, the container systems provided herein are designed to be stackable, when user employs multiple container systems for different products, such as pharmaceutical products. In certain variations, the container systems can be color-coded, e.g., by varying the color of the cap assembly, for storage of different products.

In some embodiments, the cap assembly and container may have different shapes and sizes. For example, in certain variations, the height of the cap assembly may match the height of the container. In other variations, the height of the cap assembly may be half the size of the height of the container. In some variations, the cap assembly and container may have a rounded square edge. Such shape may help to support stackability and organization in at home medicine cabinets.

The cap assembly can be made from any suitable materials. In some embodiments, the cap assembly is plastic. In some variations, the cap assembly is made from food safe materials, such as acrylonitrile butadiene styrene (ABS) or polylactic acid (PLA). In some embodiments, the cap assembly is made from a PLA/cellulose blend plastic. In some embodiments, the gasket of the cap assembly is made from a food safe material such as high-density polyethylene (HDPE).

The container may also be made from any suitable materials. For example, in some embodiments, the container is made from glass. In certain variations, the container is made from cosmetic grade, food safe glass wherein glass is specifically chosen for recyclability and elevated aesthetic. In some embodiments, the container is a sandblast painted or frosted glass bottle or jar. In some variations, the container is shatter and/or drop-resistant.

Figure 3:
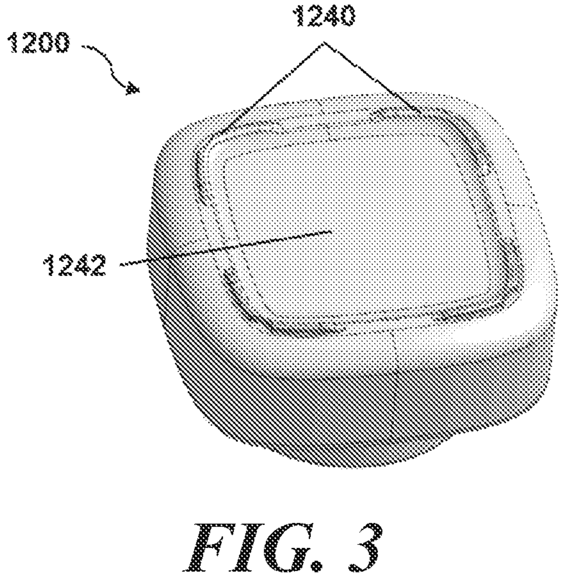
FIG. 3 depicts a bottom view of an exemplary container that can hold pharmaceutical products.

The container systems provided herein may have one or more additional features. For example, with reference to FIG. 3, the bottom side of exemplary container 1200 is depicted. Container 1200 has feet 1240. When two such containers are stacked on top of each other, feet 1240 help container 1200 to nest onto of the cap assembly of a second container (not depicted in the figure). Indentation 1242 at the bottom of container 1200 also helps the bottom to nest with the cap assembly of a second container. For example, such a design feature provides over a 45 degree level of angular lean. In other embodiments, the interior design of the container includes specific angular design features which can help to prevent products in the container from getting stuck at the corners and sides of the container.

Magnetic Token

The container systems described herein are designed to receive a magnetic token that contains information about the contents stored in the reusable container. In some variations, the magnetic token is provided in the refill pouch, whose contents (e.g., pharmaceutical products) are stored in the reusable container.

Figure 4A:
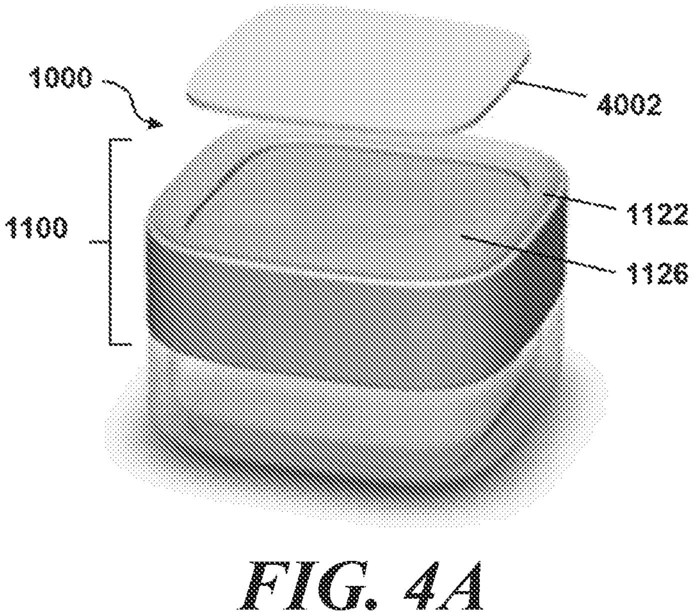
FIG. 4A depicts an exploded perspective view showing the placement of a magnetic token on the top of an exemplary cap assembly.
Figure 4B:
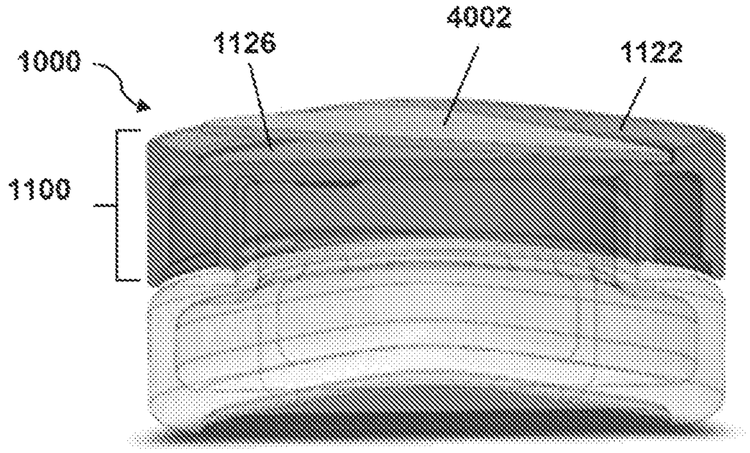
FIG. 4B depicts a magnetic token positioned in a recess on the exterior surface of the top of an exemplary cap assembly.

With reference to FIGS. 4A and 4B, exemplary container system 1000 is configured to receive magnetic token 4002. Magnetic token 4002 fits into recess 1126, positioned on exterior surface 1122 of cap assembly 1100.

In certain embodiments, the container systems may have one or more additional features to allow release of the magnetic token from the recess positioned on the exterior surface of the cap assembly. In some embodiments, the recess positioned on the exterior surface of the cap assembly further comprises an indentation in one corner of the recess wherein, the indentation allows a finger of the user to release the magnetic token from the recess. In some variations the indentation is round. In some embodiments, the magnetic token is thick or stiff enough so as to help with the removal of the magnetic token from recess positioned on the exterior surface of the cap assembly.

Figure 5:
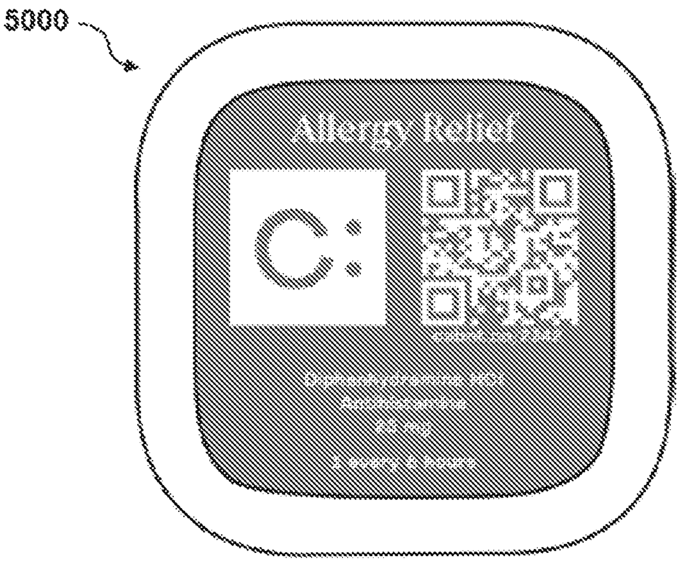
FIG. 5 depicts an exemplary magnetic token.

The token may include any suitable information about the corresponding contents held in the container. For example, with reference to FIG. 5, exemplary token 5000 is depicted. Token 5000 may include drug facts, prescription information and/or QR code. In some embodiments, the drug facts include the category (e.g. allergy relief, pain and fever, sleep and stress, digestive health, allergy relief, pain relief, sleep aid, gas relief, nasal decongestant), uses (e.g. antihistamine, seasonal allergies, pain relief, fever reducer, inflammation, insomnia, stress, gas, bloating, nasal congestion, sinus pressure, headache), name, side-effects (e.g. drowsy, non-drowsy), strength (e.g. equal, strong, light) and/or dosage of a pharmaceutical product. In some embodiments, the prescription information includes lot information, expiration information, and/or symbols for visualization of drug characteristics. In some embodiments, the QR code can be used for digital integration. As discussed above, the use of such token allows for the replacement of traditional drug product labels found on containers.

Figure 6:
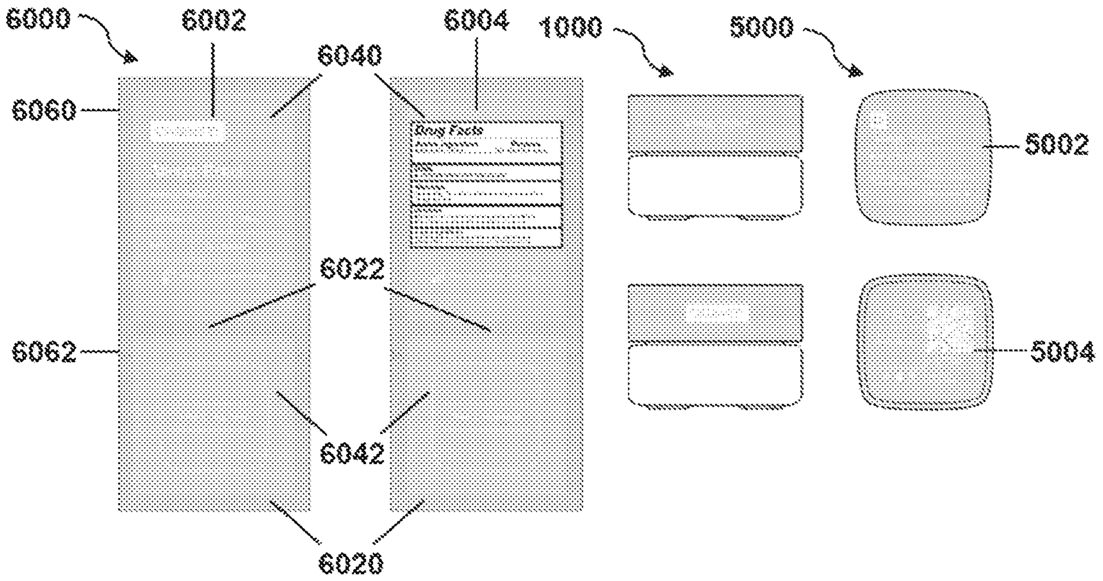
FIG. 6 depicts an exemplary refillable pharmaceutical products storage kit, which includes an exemplary refill pouch (front and bank depicted on left) and an exemplary container that can hold the pharmaceutical products along with their corresponding magnetic tokens to be placed on the top of the cap assembly (right).

Information can be provided on both sides of the token. With reference to FIG. 6, token 5000 has front side 5002 and back side 5004. For example, front side 5002 may have information related to drug facts, and back side 5004 may have prescription information and/or QR code.

In some embodiments, the magnetic token is recyclable. The token may be made from any suitable materials, including materials that make the token magnetic. In some embodiments, the magnetic token is a galvanized steel sheet. In some embodiments, the galvanized steel sheet is printed with color and text. In some embodiments, the magnetic token is color coded wherein the color coding allows color categorization of the products (e.g., pharmaceutical products) and integration with a color coded cap assembly.

Refillable Pharmaceutical Products Storage Kit

In other aspects, provided is a refillable pharmaceutical products storage kit that includes any of the container systems described herein, and at least one refill pouch. In some embodiments, the refill pouch includes a first compartment configured to hold suitable products, such as pharmaceutical products, and a second compartment configured to hold the magnetic token The magnetic token in the second compartment does not come into contact with the products in the first compartment.

In some embodiments, a first tear line is positioned along the first compartment, wherein, when a user tears the refill pouch along the first tear line, an opening is formed in the first compartment to access the pharmaceutical products therein; and a second tear line is positioned along the second compartment, wherein, when a user tears the refill pouch along the second tear line, an opening is formed in the second compartment to access the magnetic token therein.

In other embodiments, the first compartment and/or the second compartment are configured to be independently reclosable.

With reference to FIG. 6, a refillable pharmaceutical products storage kit comprising container system 1000 and refill pouch 6000 is depicted. Refill pouch 6000 is constructed from two pieces of material, front material 6002 and back material 6004. Front material 6002 and back material 6004 are joined by seal 6020 around their perimeters. A second seal 6022 extends crosswise, dividing pouch 6000 into a first compartment 6040 and a second compartment 6042. First compartment 6040 is configured to hold pharmaceutical products. Second compartment 6042 is configured to hold a magnetic token, wherein the magnetic token in the second compartment 6042 does not come into contact with the pharmaceutical products in first compartment 6040. First tear line 6060 is positioned along first compartment 6040. Second tear line 6062 is positioned along second compartment 6042.

In some embodiments, the pouch is child resistant. In some embodiments the pouch is stackable. In some embodiments to pouch is metalized. In some embodiments, the pouch has a wide opening on the top to help with the refilling and pouring process.

In some embodiments, the size of the first compartment can accommodate a plurality of pharmaceutical products, such as medicine pills or tablets. In some variations, the second compartment includes a pamphlet with drug facts in addition to the magnetic token. In some embodiments, the size of the second compartment can accommodate the magnetic token and optionally a pamphlet, which do not touch the pills within the pouch.

In some embodiments, the pouch provides information related to pharmaceutical products. In some embodiments, the information includes drug facts. In some embodiments, the drug facts include the category, uses, warnings, directions for use, and/or active and inactive ingredients for the pharmaceutical products therein.

In some embodiments, the pouch is made from bio-based or compostable materials. In some embodiments, the compostable materials meet the American Society for Testing and Materials (ASTM) D6400 standards. In some embodiments, the compostable materials meet stability standards per drug type based on monograph and Abbreviated New Drug Application products.

In some embodiments, the compostable material is multilayered. In some embodiments, the compostable material comprises at least three layers. In some embodiments, the compostable material has three layers, including a clear coated compostable print film, a compostable adhesive, and a compostable sealant film. In some embodiments, the material is thicker, harder to peel for child resistance and/or feels more robust. In some embodiments, the three layers are a metallized compostable print film, a compostable adhesive, and a compostable sealant film. In some embodiments, the compostable material is thinner, lighter weight, easy to peel and/or feels more sustainable. In some embodiments, the pouch is made from a recyclable material. In some embodiments, the recyclable material comprises ethylene vinyl alcohol film.

In some embodiments, the refillable pharmaceutical products storage kit further includes a refill guide with instructions.

What is claimed is:

1. A refillable products storage kit, comprising:
(a) a container system, comprising:
a container, wherein the container comprises:
a body, wherein the body of the container is configured to receive and hold products; and
a neck extending from the body of the container and forming the mouth of the container, wherein the neck has an exterior surface and an interior surface; and
a cap assembly configured to engage with the neck of the container, wherein the cap assembly comprises:
a top, wherein the top has an exterior surface and an interior surface;
a side connected to and extending from the top, wherein the side comprises an inner wall and an outer wall,
wherein the inner wall is cylindrical and configured to engage with the neck of the container,
a gasket connected to the interior surface of the top; and
a magnet positioned between the gasket and interior surface of the top; and
(b) a refill pouch, comprising:
a first compartment configured to hold products;
a second compartment configured to hold a magnetic token,
wherein the magnetic token in the second compartment does not come into contact with the products in the first compartment.

2. The kit of claim 1, wherein the interior surface of the top of the cap assembly comprises a recess configured to receive the magnet.

3. The kit of claim 1, wherein the exterior surface of the top of the cap assembly comprises a recess configured to receive the magnetic token, and wherein the magnet in the cap assembly is configured to hold the magnetic token in place.

4. The kit of claim 1, wherein the container further comprises: a receiving bayonet element positioned on the exterior surface of the neck of the container, and
wherein the side further comprises at least one bayonet positioned on the inner wall, wherein the at least one bayonet is configured to engage with the receiving bayonet element on the neck of the container.

5. The kit of claim 4, wherein the at least one bayonet is positioned to hold the gasket in place.

6. The kit of claim 1, wherein the gasket has an upper surface and a lower surface,
wherein the upper surface of the gasket is connected to the interior surface of the top of the cap assembly,
wherein the gasket further comprises a rim extending from the lower surface of the gasket, and
wherein the side of the cap and the rim of the gasket are configured to engage with the neck of the container when the cap assembly is secured onto the container.

7. The kit of claim 1, wherein the top of the cap assembly and the body of the container are both in the shape of a square with rounded edges.

8. The kit of claim 7, wherein the cap assembly and body of the container both have outer perimeters that are aligned.

9. The kit of claim 1, wherein the container comprises glass.

10. The kit of claim 1, wherein the refill pouch further comprises:
a first tear line positioned along the first compartment, wherein, when a user tears the refill pouch along the first tear line, an opening is formed in the first compartment to access the products therein; and
a second tear line positioned along the second compartment, wherein, when a user tears the refill pouch along the second tear line, an opening is formed in the second compartment to access the magnetic token therein.

11. The kit of claim 1, wherein: (i) the first compartment of the refill pouch is configured to be reclosable; (ii) the second compartment of the refill pouch is configured to be reclosable; or both (i) and (ii).

12. The kit of claim 1, wherein the magnetic token provides information related to the products contained in the first compartment of the refill pouch.

13. The kit of claim 1, wherein the container system is configured to store and hold the products released from the first compartment of the refill pouch.

14. The kit of claim 1, wherein the magnetic token comprises galvanized steel.

* * * * *